Nov. 15, 1949     J. D. BOLESKY     2,488,049

THERMOSTATIC SWITCH

Filed Sept. 23, 1946

INVENTOR.
JOHN D. BOLESKY
BY
Adrian Medert
ATTORNEY

Patented Nov. 15, 1949

2,488,049

UNITED STATES PATENT OFFICE 2,488,049

THERMOSTATIC SWITCH

John D. Bolesky, Mansfield, Ohio, assignor to Adrian Medert, trustee, Cleveland, Ohio Application September 23, 1946, Serial No. 698,718

5 Claims. (Cl. 200—138)

1

This invention relates to thermostatic controls and more particularly to thermostatically controlled switches and the like.

The present invention is illustrated in connection with electrically controlled switches of the thermostatically-actuated type which are used to interrupt electric circuits on the exceeding of a predetermined temperature to which the switch may be subjected and which temperature may be the result of an excessive current value in the circuit. Switches of this type are sometimes called "thermal cut-outs" and more particularly, when applied to electric motors, "motor overload protective devices." Heretofore, thermal cut-outs have been made in many forms, however, such devices have embodied many undesirable features. For example, the complicated structures of prior switches were relatively costly to manufacture, were not positive in action, could be readily interfered with to destroy the effectiveness thereof, and failed to adequately indicate the relative position of the thermal element and in turn the contacts of the switch.

It is among the objects of the present invention to provide a new thermal responsive device embodying an element which automatically trips out at a predetermined temperature or upon an overload in an electrical circuit and which is incapable of automatically returning to its initial position, requiring manual actuation to effect such return.

It is another object of the invention to provide in a thermal responsive device a thermal element having two positions of concavity, which element passes automatically from its first position to its second position upon a change in temperature and is caused to be secured in its second position upon movement thereto.

Another object of the invention is to provide a thermal responsive device wherein the thermal element is automatically secured in circuit open position upon movement to such position and including manually actuated mechanism for releasing the thermal element and permitting it to return to its original position.

Another object of the invention is to provide a thermal responsive device wherein the thermal element is free to open a circuit at a predetermined temperature irrespective of the position of the manually actuated reset mechanism.

A still further object of the invention is to provide a thermal responsive device embodying means for indicating the condition of the circuit through the device.

Another object of the invention is to provide in a thermal responsive device a reset mechanism the position of which with relation to the thermal element of the device indicates the operative position of the thermal element in the circuit through the device.

2

Other objects and advantageous features of the invention not at this time more particularly pointed out will become more apparent as the nature of the invention is better understood from the following detailed description taken in conjunction with the accompanying drawings wherein.

Figure 1:
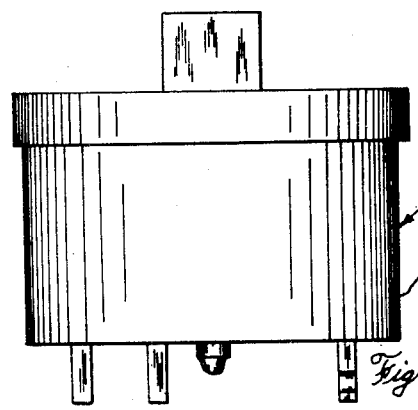
Figure 1 is a side elevational view of a thermostatic control embodying the present invention.
Figure 2:
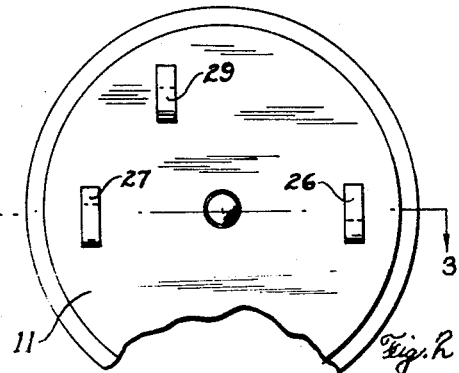
Figure 2 is a fragmentary bottom plan view of the device of Figure 1.

With reference to the accompanying drawing, the thermal cut-out device of the present invention comprises a housing or casing 10 of cup-like construction having a bottom wall portion 11 and an upstanding generally cylindrical wall portion 12. The inner surface of the wall 12 is recessed as at 13 adjacent the upper extremity to provide a seat which receives a cap or closure member 14. Projecting out of the cup-shaped casing 10 through an opening formed in the center of the member 14 is a suitably shaped control knob 15, the function and construction of which will be given in greater detail hereinafter. The casing 10, control knob 15 and closure member 14 are preferably made of an electrical insulating material which is heat resistant to a fair degree, such as a phenolic condensation product or the like.

The cylindrical wall 12, at diametrically opposed portions of the inner surface thereof, is provided with areas or sections 16 and 17 of increased thickness, in which portions are formed opposed slots 18 and 19, respectively, extending the full height of the interior of the side wall of the casing. Each of the slots 18 and 19 are provided with side walls parallel to a common plane passing through the center of the casing 10. The upper end of the slot 18 is offset as at 20 to provide a shoulder or ledge 21. Similarly, the upper end of the slot 19 is provided with a notch 21, the lower end of which defines a ledge 22. The ledge 22 is of substantially greater width than the shoulder 21 for purposes hereinafter described.

Extending through the base or bottom portion 11, in alignment with the slots 18 and 19, are openings 24 and 25, respectively, which receive terminal lugs 26 and 27. Spaced from the openings 24 and 25 there is provided another opening 28 through the base portion 11 in which there is mounted the terminal lug 29. The lugs 26, 27, and 29 are substantially identical, each comprises a shank portion 30 and a contact portion 31 extending at right angles to the shank portion. The lugs 26, 27, and 29 are secured within their respective openings by means of a sealing material 30a which is introduced into the openings along the shank portion of the lugs. The sealing material extends into openings extending through the shank portions 30 for anchoring the lugs in a predetermined position in the bottom of the casing 10.

Mounted centrally in the bottom portion 11 is a sleeve 32a which slidably receives one end of a post or supporting member 32, the latter being provided with a longitudinal bore 32b extending from the upper end thereof. In assembling the supporting post within the casing, it is adjusted to the desired position within the sleeve 32a and then secured in such adjusted position by means of solder or similar material as at 32c. The upper end of the post 32 is formed with a shoulder 33 which serves as an abutment for the lower surface of the inner periphery of a composite thermostatic plate 34. Plate 34, for example, may be a dished bi-metallic snap-acting thermostatic element of the type shown and illustrated in Spencer Patent No. 1,448,240. Among the several characteristics of such an element is that it has one position of stable equilibrium when it is cold and has another relatively stable position of equilibrium when it is hot, the hot and cold positions having opposite curvatures. The plate 34 is operatively maintained on the end of the post 32 by means of the shank portion of the knob supporting member 35, which shank portion passes freely through a hole in the center of plate 34 and is forcefitted within the bore 32b of the post 32.

The plate 34 is formed with diametrically disposed ears or lugs 37 and 38 extending outwardly from the periphery thereof. The lug 37 is provided with an upstanding flange 39 in which there is formed a slot 40. The ears 37 and 38 are operatively positioned within the diametrically opposed slots 18 and 19 where the plate 34 is mounted on the upper end of the post 32. On the surface of the ears 37 and 38 facing the bottom 11 are secured, as by welding, control buttons 41 and 42 respectively, which are so positioned as to engage the contact plates 31 of the terminal lugs 26 and 27.

The knob support 35 is formed with a central bore 44 which houses therein a spring 45. The knob 15 is provided with a bore 45a therein which receives the upper end of the support 35 and is supported thereby. When the knob 15 is operatively positioned on the support 35, the spring 45 bears against the bottom of the bore 45a and normally urges the knob upwardly. Formed on one side of the knob 15 adjacent the lower end thereof is a camming surface 46 and on the opposite side an outwardly extending flange 47 defining a shoulder 47a.

Figure 4:
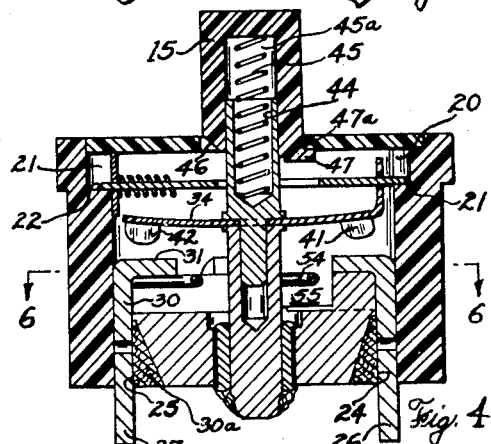
Figure 4 is a sectional view similar to Figure 3 with the operating parts thereof in circuit opening position.
Figure 5:
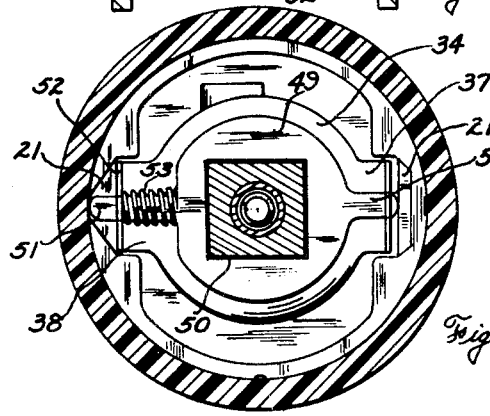
Figure 5 is a horizontal cross sectional view taken substantially along the line 5—5 of Figure 3.

Disposed between the closure member 14 and the thermostatic plate 34 is mechanism for securing the plate in one of its operative positions and for manually releasing the same. This mechanism comprises a reset plate 48 having a body portion 49 provided with a suitable opening 50 through which the reset knob 15 passes. Extending outwardly from the body 49 is a tongue 51 which engages within the notch 21 resting on the ledge 22. Encircling the tongue 51 between a plate 52 positioned in the slot 19 and the body 49 is a spring 53 which normally urges the reset plate 48 to the right as viewed in Figures 3 and 5 of the drawings. On the body 49, opposite to the tongue, is another tongue 54 which is adapted to pass through the opening 40 on the upstanding flange 39 of the plate 34 and extend into the offset 20 resting on the shoulder 21 when the device is in the position illustrated in Figure 4. Lateral shifting of the reset plate to right to release it from the shoulder 21 is effected by the camming surface 46 on the knob 15 which, when moved downwardly, engages the side of the opening 50.

Figure 6:
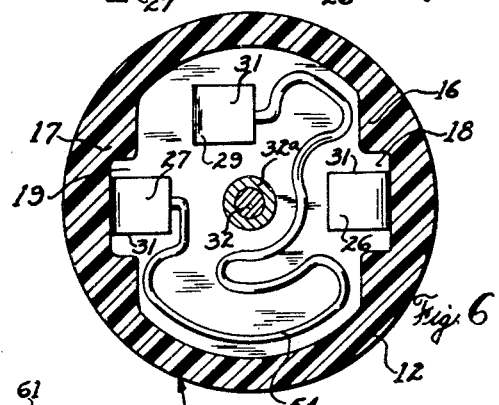
Figure 6 is a horizontal cross sectional view taken substantially along the line 6—6 of Figure 4.

A heater wire 54 (see Figure 6) is suitably fastened by spot welding or soldering to the under inside surface of the contact plate portion 31 of the lugs 27 and 29. The heater wire 54 is disposed in a suitable recess or groove 55 formed on the inside of the base portion 11.

Figure 7:
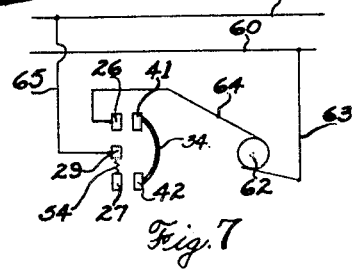
Figure 7 is a schematic electrical circuit diagram illustrating the device of the present invention applied to an electric motor.

With reference to Figure 7, there is diagrammatically illustrated the device of the present invention as used in a circuit for motor protection although it is to be understood that the device is not limited in its application to use as a motor or transformer protector and circuit breaker in the electrical field but may be used equally well in other fields where a thermal responsive device may be employed for protective purposes, for example, in mechanically controlled valves or similar devices. Numerals 60 and 61 indicate power lines and numeral 62 indicates diagrammatically a motor. A wire 63 connects one terminal of the motor to one of the power lines 60. Another wire 64 connects the other motor terminal to the terminal lug 26 of the switch of the present invention. In this circuit the terminal lug 27 is not utilized for exterior connection, but the exterior end of the lug 29 is connected as by wire 65 to the opposite power line 61. Tracing the circuit connection with the switch closed it will be seen that power passes from the supply line 60 to wire 63 to motor 62 and then through wire 64 to terminal lug 26 to contact button 41 on the thermostatic plate 34, through plate 34 and contact button 42 thereon to terminal lug 27 and thence through resistance heater wire 54 to terminal lug 29 and finally by wire 65 to the other supply line 61.

Figure 3:
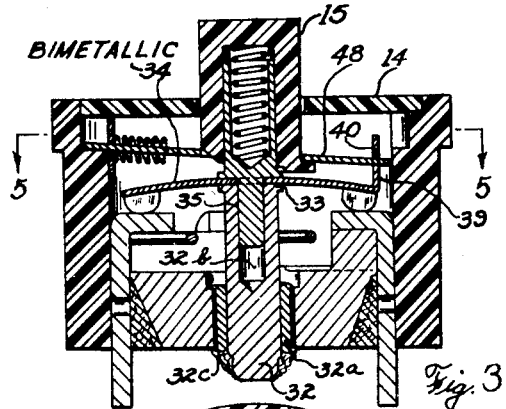
Figure 3 is an axial sectional view taken substantially along the line 3—3 of Figure 2 with the operating parts thereof in circuit closing position.

In the operation of the device, the elements thereof are normally in the position illustrated in Figure 3 of the drawings. The contact buttons 41 and 42 on the thermostatic plate 34 are in engagement with the contact surfaces 31 of the terminal lugs 26 and 27. Upon the occurrence of an excessive temperature condition or an overload in a circuit embodying the device causing a rise in the temperature of the thermostatic plate 34, it snaps into the position illustrated in Figure 4 in which the concavity of the plate 34 is opposite to that shown in Figure 3 wherein the contact buttons 41 and 42 are separated from the contact surfaces 31 and the circuit through the device is broken. When the thermostatic element assumes this position the end of the tongue 54 is raised above the ledge 21 and is projected into the offset 20 in response to pressure of the spring 53. In this position the reset plate 48 holds the plate 34 against changing its curvature or snapping back to the position shown in Figure 3 as the temperature thereof returns to normal. As the reset plate is shifted to the right the opening 50 clears the flange 47 on the button 15 and the same is propelled upwardly by the spring 45 until the shoulder 47a engages the under side of closure member 14. In this position, the knob 15 clearly indicates to an observer that the thermostatic plate is in its circuit open position and that the circuit through the device is broken. When it is desired to close the circuit through the switch after the temperature of the plate 34 has become normal, the knob 15 is moved downwardly, the flange 47 thereon first passes through the opening 50 and then the side of the opening is engaged by the camming surface 46 and the reset plate 48 is caused to be shifted to the left as viewed in Figures 3 and 4 of the drawing. The end of the tongue 54 moves out of engagement with the shoulder 21 thereby releasing the plate 34 which is then free to snap back to its original position closing the circuit through the device as illustrated in Figure 3.

It is to be noted that in the structure hereinabove described the thermostatic plate is free at all times to open the circuit when subjected to a predetermined temperature irrespective of the position of the knob 15 or the reset mechanism associated therewith. In the event that the knob 15 should be secured in its innermost position (see Figure 3) in an attempt to void the operativeness of the device, the thermal plate 34 will freely snap from positions of opposite concavity in response to temperature conditions thereby opening and closing the circuit through the device. Under such circumstances, the tongue 34 is precluded from entering the offset 21 and locking the thermal plate in the position shown in Figure 4.

Having thus described my invention so that those skilled in the art may practice the same, what I desire to obtain by Letters Patent is defined in the appended claims.

I claim:

1. A thermostatic control device comprising a housing, a base member mounted therein, supporting means mounted on said base member, a snap-acting thermostatic plate centrally mounted on said supporting means, said thermostatic plate having positions of opposite concavity and adapted to pass automatically from its first position to its second position of concavity upon a change in temperature of a predetermined value, said plate having an outwardly extending ear terminating in an upstanding flange, and means including a laterally shiftable member engageable with said upstanding flange on said thermostatic plate and said housing for locking said thermostatic plate in its second position of concavity.

2. A thermostatic control device comprising a housing, a base member mounted therein, supporting means mounted on said base member, a snap-acting thermostatic plate centrally mounted on said supporting means, said thermostatic plate having positions of opposite concavity, said thermostatic plate passing automatically from its first position to its second position of concavity upon a change in temperature of a predetermined value, said plate having an upstanding flange formed thereon, and a reciprocating member engageable with said upstanding flange on said thermostatic plate and adapted to move into locking position with the wall of said housing upon movement of said thermostatic plate into its second position of concavity whereby said member prevents the return of said plate to its first position of concavity.

3. A thermostatic control device comprising a base member, supporting means mounted thereon, a snap-acting thermostatic plate centrally mounted on said supporting means, said thermostatic plate having two positions of opposite concavity and adapted to pass automatically from its first position to its second position of concavity upon a change in temperature of a predetermined value, said plate having an outwardly extending projection terminating in an upstanding flange, a laterally shiftable member engageable with the flange on said thermostatic plate adapted to automatically lock said thermostatic plate in its second position of concavity upon its movement to such position and manually actuated means for shifting said locking member to release the thermostatic plate and permit same to return to its first position of concavity.

4. A thermostatic control device comprising a housing, a base member therein, supporting means mounted on said base member, a snap-acting thermostatic plate capable of snapping between positions of opposite concavity under changing ambient temperatures mounted on said supporting means, said plate having contacts thereon in one of said positions serving to close a circuit therethrough and in the other of said positions to open the circuit, said plate having an upstanding marginal flange, a reciprocating member engageable with the said flange on said thermostatic plate and adapted to be moved to locking position with the wall of said housing upon the snapping of said plate to circuit opening position and a member manually actuated externally of said housing and operable upon said reciprocating member for releasing said plate and permitting same to snap back to circuit closing position.

5. A thermostatic control device comprising a housing, a base member therein, supporting means slidably mounted in said base member, a snap-acting thermostatic plate capable of snapping between positions of opposite concavity under changing ambient temperatures mounted on said supporting means, said plate having an outwardly extending ear terminating in an upstanding apertured flange, said plate in one of said positions serving to close a circuit through the plate and in the other of said positions to open the circuit, means for automatically securing said plate in open circuit position upon movement thereto, said means including a laterally shiftable member adapted to traverse the flange and engage the wall of said housing, manually actuated means for releasing said securing means, said thermostatic plate being so arranged as to move from circuit closing position to circuit opening position irrespective of the position of said securing means or said manually actuated means.

JOHN D. BOLESKY.

REFERENCES CITED

The following references are of record in the file of this patent:

UNITED STATES PATENTS

| Number | Name | Date |
| --- | --- | --- |
| 1,958,789 | Hooper | May 15, 1934 |
| 2,157,857 | Lee | May 9, 1939 |
| 2,162,485 | Lee | June 13, 1939 |
| 2,262,205 | Schachtner | Nov. 11, 1941 |
| 2,327,336 | Bolesky | Aug. 24, 1943 |